(12) United States Patent
Tollefson

(10) Patent No.: US 11,924,341 B2
(45) Date of Patent: Mar. 5, 2024

(54) RELIABLE CRYPTOGRAPHIC KEY UPDATE

(71) Applicant: Rockwell Collins, Inc., Cedar Rapids, IA (US)

(72) Inventor: William T. A. Tollefson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 359 days.

(21) Appl. No.: 17/241,593

(22) Filed: Apr. 27, 2021

(65) Prior Publication Data

US 2022/0345305 A1 Oct. 27, 2022

(51) Int. Cl.
*H04L 9/08* (2006.01)
*G06F 21/60* (2013.01)

(52) U.S. Cl.
CPC .......... *H04L 9/0872* (2013.01); *G06F 21/602* (2013.01); *H04L 9/0894* (2013.01)

(58) Field of Classification Search
CPC .... H04L 9/0872; H04L 9/0894; G06F 21/602
USPC ....................................................... 713/168
See application file for complete search history.

(56) References Cited

U.S. PATENT DOCUMENTS

| | | | |
|---|---|---|---|
| 7,657,036 B2 | 2/2010 | Hsu et al. | |
| 7,936,878 B2 | 5/2011 | Kune et al. | |
| 8,312,294 B2 | 11/2012 | Sato et al. | |
| 8,666,077 B2 | 3/2014 | Patel et al. | |
| 8,707,045 B2 | 4/2014 | Han et al. | |
| 10,368,238 B2 | 7/2019 | Wu | |
| 2009/0276629 A1 | 11/2009 | Wu et al. | |
| 2011/0188654 A1* | 8/2011 | Yao | H04L 9/08 380/255 |
| 2014/0237559 A1 | 8/2014 | Zhang et al. | |
| 2019/0013937 A1* | 1/2019 | Leong | H04L 9/0861 |
| 2020/0106617 A1* | 4/2020 | Rule | H04L 9/0861 |
| 2020/0111095 A1* | 4/2020 | Osborn | H04L 63/0435 |

FOREIGN PATENT DOCUMENTS

| | | |
|---|---|---|
| WO | 2006102565 A2 | 12/2007 |
| WO | 2015135292 A1 | 9/2015 |

* cited by examiner

*Primary Examiner* — Kambiz Zand
*Assistant Examiner* — Phuc Pham
(74) *Attorney, Agent, or Firm* — Suiter Swantz pc llo

(57) ABSTRACT

A method for updating a cryptographic key via a computation unit configured with one or more processors and a memory coupled to the one or more processors is disclosed. The method includes loading a base key into a cryptographic storage unit integrated with a cryptographic application. The method includes generating a temporal key based on the base key using a one-way key update algorithm via cryptographic application logic integrated within the cryptographic application. The temporal key is assigned an update count based on the number of updates performed on the temporal key. The method further includes comparing the update count value to a required update count, updating the temporal key if the update count is less than the required update count, and zeroizing the temporal key if the update count is more than the required update count, in which the temporal key may be regenerated with the required update count.

13 Claims, 4 Drawing Sheets

RELIABLE CRYPTOGRAPHIC KEY UPDATE

BACKGROUND

Cryptographic keys are pieces of information (e.g., information strings or parameters) that determine the functional output of a cryptographic algorithm. For example, in encryption, a cryptographic key specifies the transformation of unencrypted information (e.g., plaintext) into encrypted information (e.g., ciphertext) and vice-versa, depending on the decryption algorithm.

In order to retain/promote secrecy, cryptographic keys may undergo an update operation that modifies both the key and a key tag. This modification may be based on a time period that is determined and/or initiated by application software operating within a radio network. Cryptographic keys may then be characterized by their update count. For example, a cryptographic may be configured to have an update count of "n", wherein "n" is the number of cryptographic updates that have been performed on the key. In another example, a cryptographic key with an update count of zero indicates that no updates have been. The update process is typically irreversible. For example, a cryptographic key with an update count "n" may not be converted to a cryptographic key having an update count less than "n".

In practice, cryptographic key standards define two types of key update schemes. Firstly, the cryptographic key may be updated in place, wherein the current cryptographic key is updated. For example, the cryptographic key may move from an update count from "n" to "n+1". Secondly, a "update-and-create-new" key update scheme is utilized, wherein the cryptographic key may be copied, and one of the keys is updated. For example, the original cryptographic key, having an update count of "n" is copied, with the originally cryptographic key having an update count of "n", and the copied cryptographic key having an update count of "n+1", or vice-versa. The "update-and-create-new" type of key update scheme may be used for radio networks (e.g., waveforms) that require cryptographical midnight rollover periods where network time may have variation between terminals and different keys should be tried for traffic encryption/decryption.

In some situations, radio networks may require a cryptographic key update of "n", and then need to change to cryptographic key update "m" based on operational need, different configurations, and other parameters. The change from update "n" to "m" may be workable if "m" is greater than "n". However, if "m" is less than "n", in violation of cryptographic key rules, encryption/decryption will fail, since moving the update count from "n" to "m" is not possible unless a solution is applied. Because many systems use multiple radio networks or waveforms and services that use key updates, the systems typically suffer from a scenario where a key has been updated too many times due to a previous configuration (e.g., and is forbidden to update further), and there isn't a method to lower an update count on the same key.

Currently, solutions that enable encryption/decryption to move forward under "m>n" conditions include (1) zeroizing the updated cryptographic keys and reloading the original cryptographic key with an update count of zero, or (2) updating the radio network configuration to not require the lower update count. These solutions are suboptimal as they create logistical concerns and unreliability issues during configuration changes. Accordingly, it is desirable to provide a cryptographic update solution that solves the "m>n" condition while avoiding the logistical concerns and network unreliability issues of the conventional approaches.

SUMMARY

A method for updating a cryptographic key via a computation unit configured with one or more processors and a memory coupled to the one or more processors is disclosed. In one or more embodiments, the method includes loading a first base key into a cryptographic storage unit integrated with a cryptographic application, wherein the first base key is persistent. In one or more embodiments, the method further includes generating a first temporal key based on the first base key using a one-way key update algorithm via cryptographic application logic integrated within the cryptographic application. In one or more embodiments, the first temporal key is assigned a first update count based on the number of updates performed on the first temporal key. In one or more embodiments, the method further includes comparing the first update count value to a required update count. In one or more embodiments, the method further includes updating the first temporal key if the first update count is less than the required update count, wherein the first temporal key is continually updated until the first update count is equal to the required update count. In one or more embodiments, the method further includes zeroizing the first temporal key if the first update count is more than the required update count.

In some embodiments of the method, upon a zeroization of the first temporal key, a new first temporal key is generated based on the first base key, the new first temporal key configured a new first update count, wherein the new first temporal key is updated until the new first update count is equal to the required update count.

In some embodiments of the method, the first base key cannot be updated.

In some embodiments of the method, the method further includes generating a second base key, wherein the second base key is persistent, wherein the first temporal key may be generated from the second base key.

In some embodiments of the method the second base key is updatable.

In some embodiments, the method is configured to use an update-and-create-new key update scheme.

In some embodiments of the method, upon the zeroization of the first temporal key, one or more keys within a lineage of the first temporal key are zeroed.

A system is also disclosed. In one or more embodiments, system includes a computation unit. In one of more embodiments, the computation unit includes one or more processors. In one or more embodiments, the computation unit includes a memory communicatively coupled to the one or more processors and having instructions stored thereon, which are executed by the one or more processors. In one or more embodiments, the one or more processors are instructed to load a first base key into a cryptographic storage unit integrated with a cryptographic application, wherein the first base key is persistent. In one or more embodiments, the one or more processors are instructed to generate a first temporal key based on the first base key using a one-way key update algorithm via cryptographic application logic integrated within the cryptographic application, wherein the first temporal key is assigned a first update count based on a number of updates performed on the first temporal key. In one or more embodiments, the one or more processors are instructed to compare the first update count value to a required update count. In one or more embodiments, the one or more processors are instructed to update the first temporal key if the first update count is less than the required update count, wherein the first temporal key is continually updated until the first update count is equal to the required update count. In one or more embodiments, the one or more processors are instructed to zeroize the first temporal key if the first update count is more than the required update count.

In some embodiments of the system, upon a zeroization of the first temporal key, a new first temporal key is generated based on the first base key, the new first temporal key configured a new first update count, wherein the new first temporal key is updated until the new first update count is equal to the required update count In some embodiments of the system, the first update key cannot be updated.

In some embodiments of the system, the one or more processors are further instructed to generate a second base key, wherein the second base key is persistent, wherein the first temporal key may be generated from the second base key.

In some embodiments of the system, the second base key is updatable.

In some embodiments of the system, upon the zeroization of the first temporal key, one or more keys within a lineage of the first temporal key are zeroed.

In some embodiments, the system is configured to use an update-and-create-new key update scheme.

In some embodiments, the system further includes a radio, wherein the computation unit is integrated into the radio.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
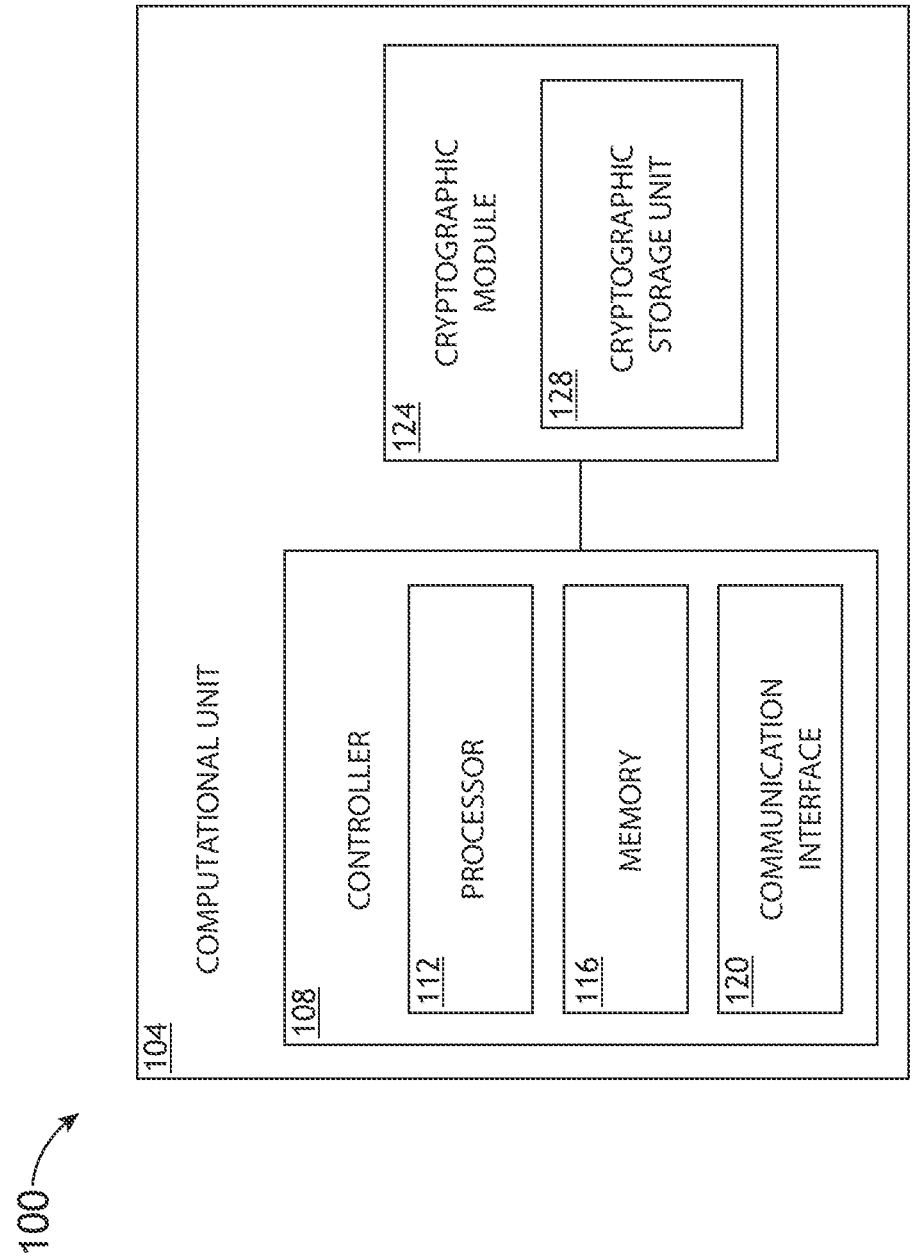
FIG. 1 is a block diagram illustrating a system for management of cryptographic keys, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system and method for updating cryptographic keys is disclosed. Specifically, a system and method for updating cryptographic keys for systems requiring different key update values for different configurations or operational needs. In particular, a base key is persistently stored in a cryptographic storage unit, and is not updated. The base key may then be used to generate updatable and temporal cryptographic keys that are used for encryption/decryption. The lifetime of the updatable temporal cryptographic keys is limited to predetermined update counts, whereas the lifetime of the base key is limited to specific time periods. One the predetermined update count has been reached, the updatable cryptographic key is zeroized and a new cryptographic key may be regenerated from the base key (e.g., the base key is preserved in case a lower update count is required by the application). The method and system offer a solution for cryptographic key maintenance systems that do not allow reversion of cryptographic keys from higher update counts to lower update counts without significant implementation or training complexities. Furthermore, the method and system provide flexibility to applications that use key updates and does not open significant attack vectors, as a precedent is already in place to have multiple keys with different updasste counts. For example, the method and system may be configure to use the "update-and-create-new" type of key update.

FIG. 1 is a block diagram illustrating a system 100 for management of cryptographic keys, in accordance with one or more embodiments of this disclosure. The system 100 may be configured as a module or component within any type of network, system, organization, or scheme that requires cryptographic security including but not limited to communication systems, navigation systems, transportation systems, and ballistic systems.

In some embodiments, the system 100 includes a computation unit 104 configured to monitor and maintain cryptographic keys. The computation unit 104 may be any type of computer or processing unit. For example, the computation unit may be configured as a hardware security module. In some embodiments, the computation unit 104 includes a controller 108 one or more processors 112, a memory 116, and a communication interface 120. The controller 108 is configured to provide processing functionality for at least the computation unit 104 and can include the one or more processors 112 (e.g., micro-controllers, circuitry, field programmable gate array (FPGA), central processing units (CPU), application-specific integrated circuit (ASIC), or other processing systems), and resident or external memory 116 for storing data, executable code, and other information. The controller 108, via the one or more processors 112, can execute one or more software programs embodied in a non-transitory computer readable medium (e.g., memory 116) that implement techniques described herein. The controller 108 is not limited by the materials from which it is formed or the processing mechanisms employed therein and, as such, can be implemented via semiconductor(s) and/or transistors (e.g., using electronic integrated circuit (IC) components), and so forth.

The memory 116 can be an example of tangible, computer-readable storage medium that provides storage functionality to store various data and/or program code associated with operation of the controller 108, such as software programs and/or code segments, or other data to instruct the controller 108, and possibly other components of the computation unit 104, to perform the functionality described herein. Thus, the memory 116 can store data, such as a program of instructions for operating the computation unit 104, including its components (e.g., controller 108, communication interface 120, etc.), and so forth (e.g., the instructions causing the one or more processors to implements the techniques described herein). It should be noted that while a single memory 116 is described, a wide variety of types and combinations of memory 116 (e.g., tangible, non-transitory memory) can be employed. The memory 116 may be integral with the controller 108, may comprise stand-alone memory, or may be a combination of both. Some examples of the memory 116 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 120 may be operatively configured to communicate with components of the computation unit 104 and the system 100. For example, the communication interface 120 can be configured to retrieve data from the controller 108 or other components, transmit data for storage in the memory 116, retrieve data from storage in the memory 116, and so forth. The communication interface 120 can also be communicatively coupled with the controller 108 to facilitate data transfer between components of the computation unit 104 and the controller 108. It should be noted that while the communication interface 120 is described as a component of the computation unit 104, one or more components of the communication interface 120 can be implemented as external components communicatively coupled to the computation unit 104 via a wired and/or wireless connection. The computation unit 104 can also include and/or connect to one or more input/output (I/O) devices. In embodiments, the communication interface 120 includes or is coupled to a transmitter, receiver, transceiver, physical connection interface, or any combination thereof.

In some embodiments, the computation unit 104 include a cryptographic module 124 configured to carry out one or more key maintenance functions of the system 100. The cryptographic module 124 may be integrated with, and may utilize one or more components of the controller (e.g., the one or more processors 112, memory 116, or communication interface 120). For example, the cryptographic module may store data or execute programs specific for the maintenance of cryptographic keys and other encryption/decryption processes.

In some embodiments, the cryptographic module 124 includes a cryptographic storage unit 130. The cryptographic storage unit 128 is configured to store and/or maintain cryptographic keys. The cryptographic storage may share data storage components with the memory 116 of the computation unit 104 or may be configured with stand-alone data storage.

The system 100 may be configured as a stand-alone apparatus or include a device (e.g., the computation unit 104 being integrated into the device). For example, the system 100 may include, and the computation unit 104 may be integrated into, any type of device including but not limited to communication devices, vehicles, weapons, computers, or any other device that may require cryptographic keys. For instance, the system 100 may include, and computation unit 104 may be integrated into, a radio. In particular, the computation unit 104 may be integrated into a radio that is itself integrated within a radio network or waveform.

Figure 2:
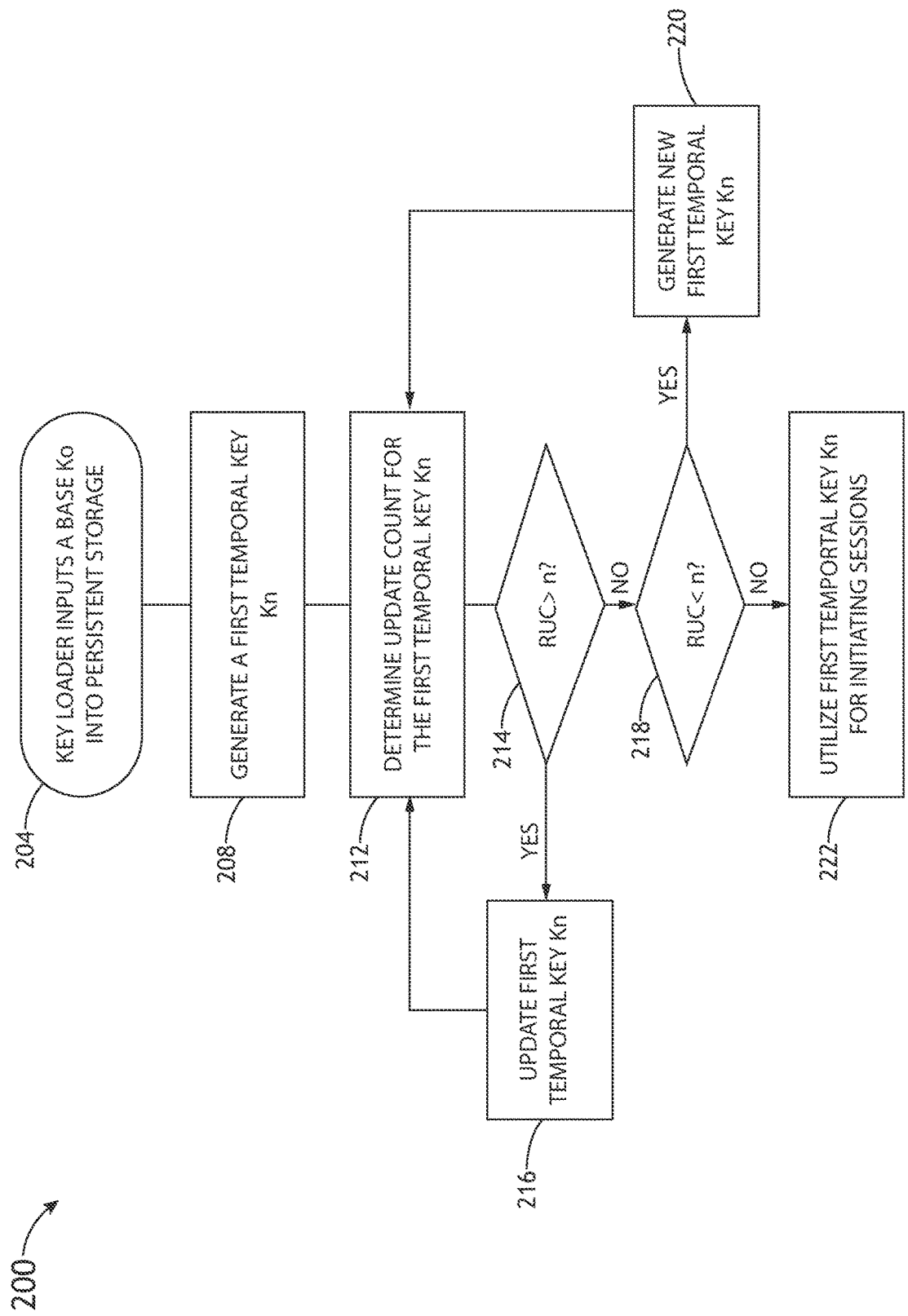
FIG. 2 is a flow diagram illustrating a key maintenance scheme utilized by the computation unit, in accordance with one or more embodiments of the disclosure.

FIG. 2 is a flow diagram illustrating the key maintenance scheme 200 utilized by the computation unit 104, in accordance with one or more embodiments of the disclosure. The cryptographic keys maintained by the key maintenance scheme 200 may be any type of cryptographic key. For example, the cryptographic key may be either an asymmetric key or symmetric key. In another example, the key maintenance scheme 200 may maintain long term keys, single use keys, or keys configured with limited number of updates. Other types of cryptographic keys that may be utilized by the key maintenance scheme include but are not limited to private signature keys, public signature verification keys, symmetric authentication keys, private authentication keys, public authentication keys, symmetric data encryption keys, symmetric key wrapping keys, symmetric and asymmetric random number generation keys, symmetric master keys, private key transport keys, public key transport keys, symmetric key agreement keys, private static key agreement keys, public static key agreement keys, private ephemeral key agreement keys, public ephemeral key agreement keys, symmetric authorization keys, private authorization keys, and public authorization keys.

In embodiments, a base key Ko is loaded into persistent storage within the cryptographic storage unit 128. For example, the base key Ko may be placed into the cryptographic storage unit 128 via a key loader (e.g., process 204). The base key Ko may have a lifespan based upon the cryptographic configuration of the key maintenance scheme 200. For example, the base key Ko may be configured to never be overwritten unless a zeroization command is executed. In another example, the base key Ko may be configured to for a select number of uses/initializations. In another example, the base key Ko may be configured for a specific temporal lifespan.

In embodiments, one or more temporal keys are generated based off of the base key Ko (e.g., one or more temporal copies of the base key Ko are created, as shown in process 208). For example, a first temporal key, Kn, may be created. In another example, a second temporal key, Km, may be created. The first temporal key Kn and second temporal key Km may be generated via any type of method and/or algorithm. For example, the first temporal key Kn and second temporal key Km may be generated via one-way key update algorithms that also generate integer numbers based on the number of updates. For example, the first temporal key Kn may be configured with a first update count of n. In another example, the second temporal key Km may be configured with a second update count of m. The values of n and m change based on the number of updates that have been performed upon the first temporal key Kn and/or the second temporal key Km. For example, first temporal key Kn with a first update count of n may have a new count (e.g., value) of n+1 after a subsequent update. Within the key maintenance scheme 200, the base key Ko is typically not updated, having an update count of zero.

Communication networks and other devices that that utilize the system 100 require initialization by a cryptographic key with a required update count (RUC). For example, a communication system may require the first temporal key Kn to have a first update value equal to the RUC (e.g., n=RUC) for initialization to occur. Application logic within the cryptographic module (e.g., running a cryptographic application), can determine the first update count (e.g., as shown in process 212) and compare the first update count to the RUC. In some instances, the first update count may not equal the RUC. For example, for a communication system with an RUC of 1 (e.g., RUC=1) and the first temporal key Kn is determined to have an update count of zero (e.g., n=0, as stated in decision 214), the first temporal key Kn will then updated by one update (e.g., from n=0 to n=1, as shown in process 216). In another example, for a communication system with an RUC of 2, but the first update count of the first temporal key Kn is larger (e.g., n=3, as determined in decision block 218), the first temporal key Kn cannot be used as an update count value cannot be reduced. Instead, a new first temporal key Kn will be generated (e.g., process 220) The newly generated first temporal key Kn will have the same update count of the base key Ko (e.g., n=0) and will need to be updated to the update count necessary to initialize the session (e.g., n=RUC). Once the cryptographic module has determined that the first temporal key Kn has the correct update count (e.g., n=RUC), the first temporal key Km may be used for initialization (e.g., process 222).

In some embodiments, the first temporal key Kn is regenerated after each use. For example, after the first temporal key Kn is utilized to initialization session of a communication system requiring an update count of m (e.g., RUC=n), the first temporal key Kn may be automatically zeroized. The communication system may then initiate another session that requires updated keys (e.g., RUC+1). A new first temporal key may then be generated (e.g., with n=0 and subsequently updated to the appropriate update count.

In some embodiments, the base key Ko is configured to generate a secondary base key Ko'. The secondary base key Ko' may have functionality similar to both the base key Ko and the first temporal key Kn. For example, the secondary base key Ko' may be persistently stored and have the ability to generate a first temporal key Kn or a second temporal key Km. In another example, the secondary base key Ko' may also be utilized by the application logic for initializing sessions. For instance, the secondary base key Ko' may be updated after initializing a session, and acquire an update count greater than zero. Implementation instructions from the cryptographic application may determine if a temporal key is committed to persistent storage. This determination may be based on several factors including but limited to the complexity of generating the key, storage requirements, and the likelihood that the same key or subsequent key will be generated again.

Figure 3:
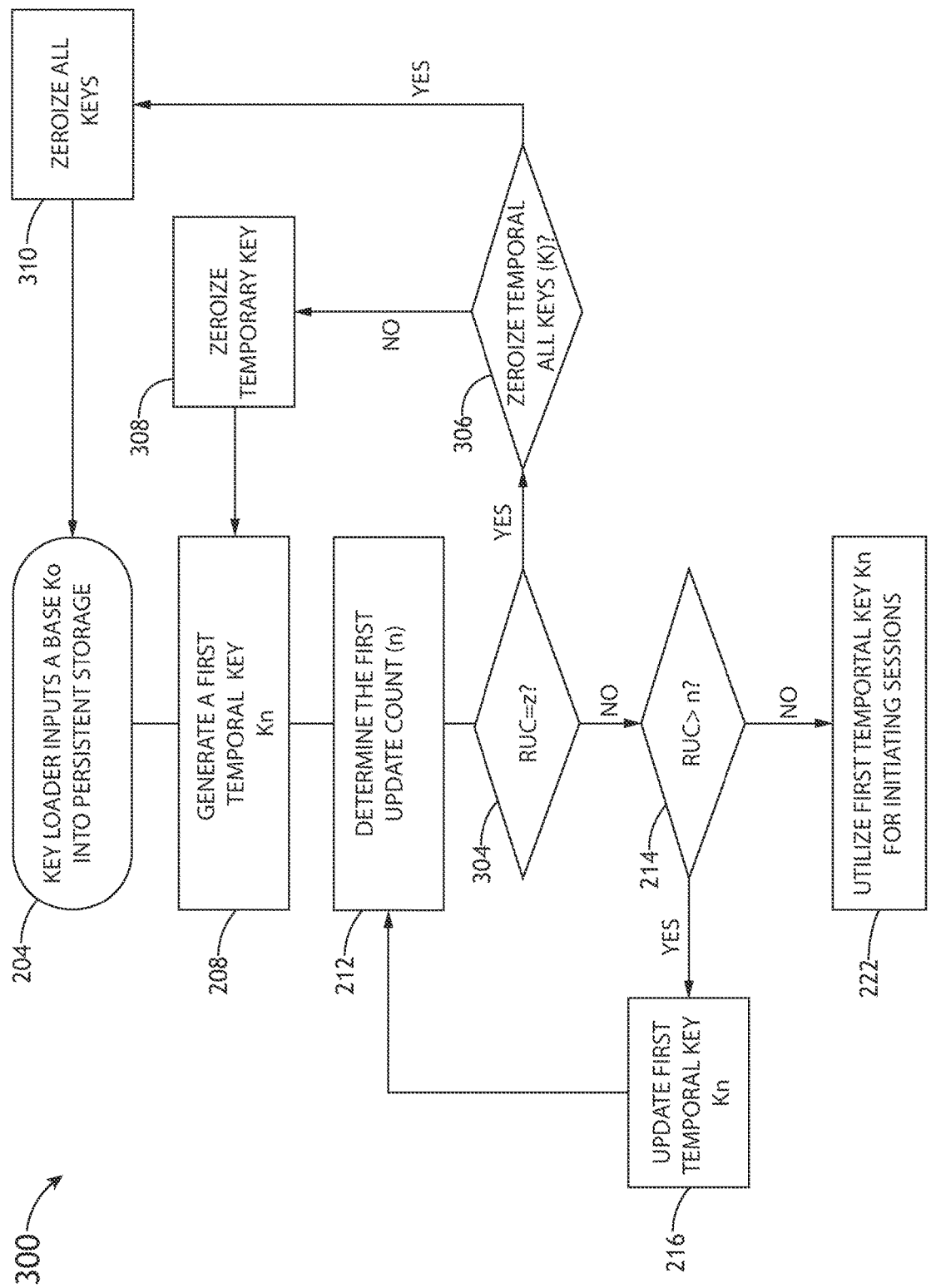
FIG. 3 is a flow diagram illustrating a key maintenance scheme utilized by the computation unit, in accordance with one or more embodiments of the disclosure.

In some embodiments, base key Ko, first temporal key Kn and/or the second temporal key Km are zeroized based on a key maintenance scheme 300 as directed by the application logic of the cryptographic application (e.g., as shown in FIG. 3). Key maintenance scheme 300 may contain on or more, or all the steps of key maintenance scheme 200, and vice-versa.

In embodiments, the key maintenance scheme 300 includes determining if the first temporal key Km update value is equivalent to a predetermined zeroization value of the system 100 (e.g., z, as shown in process 304). For example, if the first temporal key Kn update value is equivalent to the zeroization value (e.g., n=z), cryptographic zeroization will occur (e.g., via the application logic), and all key forms having tagged information that is targeted by the cryptographic zeroization process may potentially be zeroed (e.g., as shown in decision 306). For instance, if the cryptographic zeroization process is targeting only keys of that have an update count over a specific value (e.g., n>x), then only those temporal keys having a higher update count will be zeroed (e.g., process 308). In another instance, if the cryptographic zeroization process targets all keys of the same lineage (e.g., K) once a key from that lineage (e.g., first temporal key Km) has an update count over a specific value (e.g., n>x), then all K-related keys (e.g., Km, Kn, Ko) will be zeroed (e.g., process 310).

Figure 4:
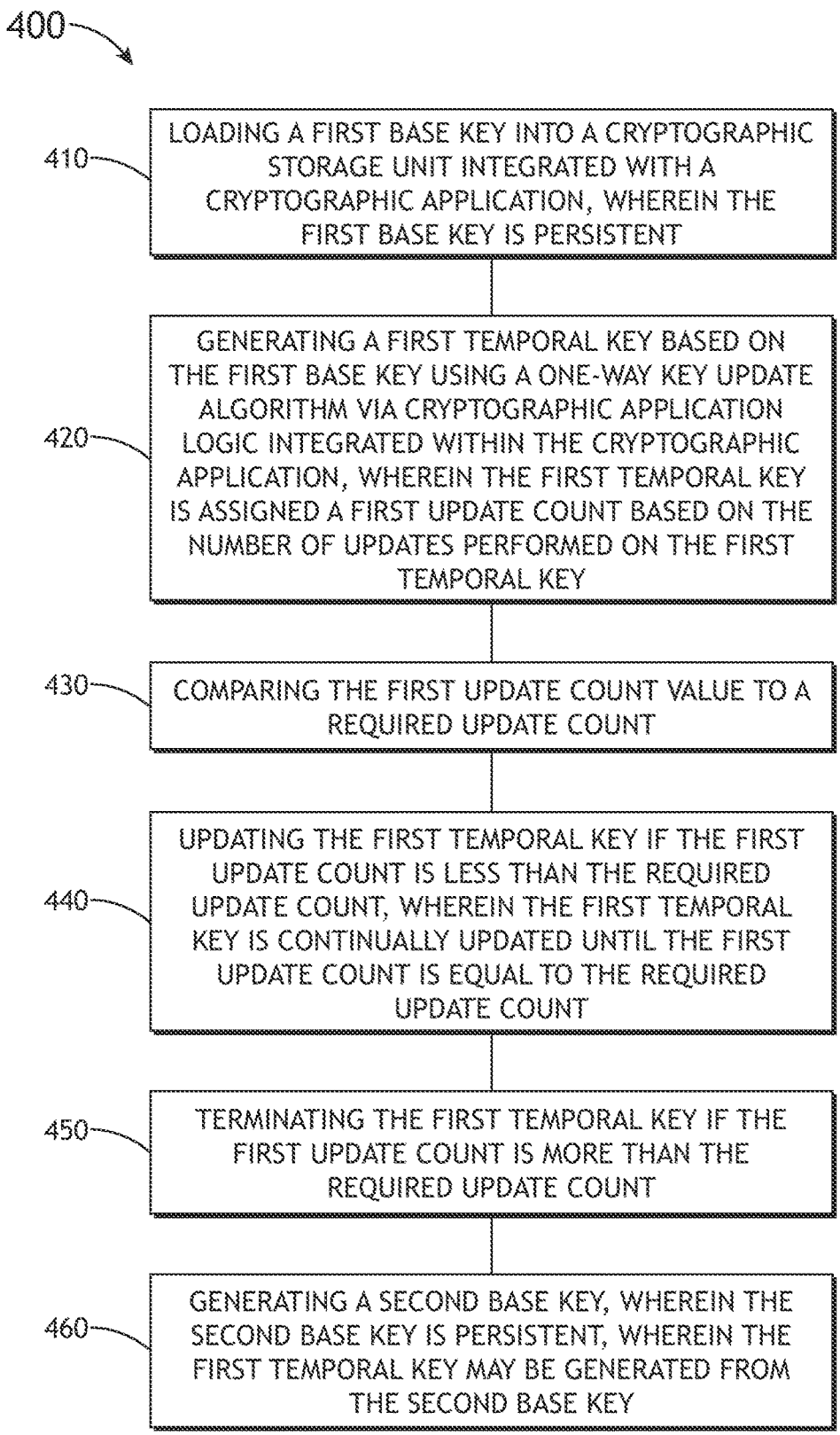
FIG. 4 is a flowchart illustrating a method updating a computation unit, in accordance with one or more embodiments of the disclosure.

FIG. 4 is a flowchart illustrating a method 400 for updating a computation unit 104 configured with one or more processors 112 and a memory 116 coupled to the one or more processors 112, in accordance with one or more embodiments of the disclosure. In embodiments, the method 400 includes a step 410 of loading a first base key Ko into a cryptographic storage unit integrated with a cryptographic application, wherein the first base key is persistent. For example, the first base key Ko may be loaded into the cryptographic storage unit via a key loader. The cryptographic application may include any coding or software that manages key updates, key storage, encrypts or decrypts.

In embodiments, the method 400 further includes a step 420 of generating a first temporal key Kn based on the first base key Ko using a one-way key update algorithm via cryptographic application logic integrated within the cryptographic application, wherein the first temporal key Kn is assigned a first update count based on the number of updates performed on the first temporal key Kn. The one-way key update algorithm prevents reversion updating of cryptographic keys.

In embodiments, the method 400 further includes a step 430 of comparing the first update count value to a required update count (RUC). The RUC may be any value as required by for the computation unit 104. The comparison may be generated within the cryptographic module via the one or more processors 112.

In embodiments, the method includes a step 440 of updating the first temporal key Kn if the first update count is less than the required update count, wherein the first temporal key is continually updated until the first update count is equal to the required update count. For example, if the RUC equals 8, and the first update count equals 3, the first temporal key will be updated until the first update count also equals 8.

In some embodiments, the method 400 includes a step 450 of zeroing the first temporal key Kn if the first update count is more than the required update count. The first temporal key Kn may be zeroized by any method known including but not limited to key destruction, key deletion, or other zeroizing methods. After zeroization of the first temporal key Kn a new first temporal key may be generated based on the first base key Ko. This new first temporal key may be configured with a new first update count, and the new first temporal key may be updated until the new first update count is equal to the RUC.

In some embodiments, the method 400 includes a step 460 of second base key Ko', wherein the second base key Ko' is persistent, wherein the first temporal key Kn may be generated from the second base key Ko'. The second base key Ko' may also be updatable.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A method for updating a cryptographic key via a computation unit configured with one or more processors and a memory coupled to the one or more processors comprising:
    loading a first base key into a cryptographic storage unit integrated with a cryptographic application, wherein the first base key is persistent, wherein a lifetime of the first base key is limited to a specific time period;
    generating a first temporal key based on the first base key using a one-way key update algorithm via cryptographic application logic integrated within the cryptographic application, wherein the first temporal key is assigned a first update count based on a number of updates performed on the first temporal key;
    comparing the first update count value to a required update count;
    updating the first temporal key if the first update count is less than the required update count, wherein the first temporal key is continually updated until the first update count is equal to the required update count; and
    terminating the first temporal key if the first update count is more than the required update count,
    wherein upon a zeroization of the first temporal key, a new first temporal key is generated based on the first base key, the new first temporal key configured a new first update count, wherein the new first temporal key is updated until the new first update count is equal to the required update count.

2. The method of claim 1, wherein the first base key cannot be updated.

3. The method of claim 1 further comprising generating a second base key, wherein the second base key is persistent, wherein the first temporal key may be generated from the second base key.

4. The method of claim 2, wherein the second base key is updatable.

5. The method of claim 1, wherein upon a zeroization of the first temporal key, one or more keys within a lineage of the first temporal key are zeroed.

6. The method of claim 1, wherein the method is configured to use an update-and-create-new key update scheme.

7. A system comprising:
    a computation unit comprising:
        one or more processors;
        a memory communicatively coupled to the one or more processors and having instructions stored thereon, which when executed by the one or more processors, causing the one or more processors to:
            load a first base key into a cryptographic storage unit integrated with a cryptographic application, wherein the first base key is persistent, wherein a lifetime of the first base key is limited to a specific time period;
            generate a first temporal key based on the first base key using a one-way key update algorithm via cryptographic application logic integrated within the cryptographic application, wherein the first temporal key is assigned a first update count based on a number of updates performed on the first temporal key;
            compare the first update count value to a required update count;
            update the first temporal key if the first update count is less than the required update count, wherein the first temporal key is continually updated until the first update count is equal to the required update count; and
            terminate the first temporal key if the first update count is more than the required update count,
            wherein upon a zeroization of the first temporal key a new first temporal key is generated based on the first base key, the new first temporal key configured a new first update count, wherein the new first temporal key is updated until the new first update count is equal to the required update count.

8. The system of claim 7, wherein the first base key cannot be updated.

9. The system of claim 7, wherein the one or more processors are further instructed to generate a second base key, wherein the second base key is persistent, wherein the first temporal key may be generated from the second base key.

10. The system of claim 8, wherein the second base key is updatable.

11. The system of claim 7, wherein the system is configured to use an update-and-create-new key update scheme.

12. The system of claim 7, wherein upon a zeroization of the first temporal key, one or more keys within a lineage of the first temporal key are zeroed.

13. The system of claim 7, further comprising a radio, wherein the computation unit is integrated into the radio.

* * * * *